US009263159B2

(12) United States Patent  
Jensen et al.

(10) Patent No.: US 9,263,159 B2
(45) Date of Patent: Feb. 16, 2016

(54) HIGH RADIOACTIVITY FILTER

(75) Inventors: Charles E. Jensen, Knoxville, TN (US); Dennis A. Brunsell, Knoxville, TN (US)

(73) Assignee: AVANTech, Inc., Columbia, SC (US)

( * ) Notice: Subject to any disclaimer, the term of this patent is extended or adjusted under 35 U.S.C. 154(b) by 1096 days.

(21) Appl. No.: 13/441,834

(22) Filed: Apr. 6, 2012

(65) Prior Publication Data

US 2012/0305458 A1 Dec. 6, 2012

Related U.S. Application Data

(60) Provisional application No. 61/473,020, filed on Apr. 7, 2011.

(51) Int. Cl.
*B01D 24/38* (2006.01)
*G21F 9/12* (2006.01)
*G21F 9/16* (2006.01)
*C02F 1/42* (2006.01)
*C02F 101/00* (2006.01)

(52) U.S. Cl.
CPC ........ *G21F 9/12* (2013.01); *G21F 9/125* (2013.01); *G21F 9/16* (2013.01); *C02F 1/42* (2013.01); *C02F 2101/006* (2013.01)

(58) Field of Classification Search
None
See application file for complete search history.

(56) References Cited

U.S. PATENT DOCUMENTS

| 3,187,934 | A | | 6/1965 | Huber |
|---|---|---|---|---|
| 4,107,044 | A | * | 8/1978 | Levendusky ............ 210/266 |
| 4,422,964 | A | * | 12/1983 | Capolupo ............... 588/16 |
| 4,625,892 | A | | 12/1986 | Carlin, Jr. |
| 4,712,711 | A | | 12/1987 | Geering et al. |
| 4,828,691 | A | * | 5/1989 | Abbott et al. ............ 210/87 |
| 4,983,282 | A | * | 1/1991 | Roy et al. ............... 210/95 |
| 5,026,478 | A | | 6/1991 | Tanabe et al. |
| 5,225,114 | A | | 7/1993 | Anderson et al. |
| 5,232,599 | A | * | 8/1993 | Cole ..................... 210/609 |
| 5,770,070 | A | * | 6/1998 | Davis et al. ............ 210/266 |
| 6,387,274 | B1 | | 5/2002 | Hendricks et al. |
| 2009/0314791 | A1 | | 12/2009 | Hartley et al. |

OTHER PUBLICATIONS

"Excerpts from: ASME Boiler and Pressure Vessel Code, Section VIII—Rules for Construction of Pressure Vessels," American Society of Mechanical Engineers, 2007.
AVANTech, Incoporated, "A-43 High Integrity Container (A-43 HIC)," (2006) <www.avantechinc.com/downloads/high-integrity-container.pdf>.
"Application of Ion Exchange Processes for the Treatment of Radioactive Waste and Management of Spent Ion Exchangers," Technical Report Series No. 408, International Atomic Energy Agency, Vienna, Jun. 2002.
Barker, Tracy A., "Improved Techniques for Packaging Irradiated Metal Segmentation Wastes," WM '01 Conf, Tucson, Feb. 25-Mar. 1, 2001.
Baxter, S.G., et al,. "The Selection and Performance of the Natural Zeolite Clinoptilolite in British Nuclear Fuels' Site Ion Exchange Effluent Plant, SIXEP," Waste Management '86, vol. 2 (Proc. Int. Conf., Tucson, 1986), Board of Regents, Phoenix, 1986, pp. 347-356.
"Handling and Processing of Radioactive Waste from Nuclear Applications," International Atomic Energy Agency, Vienna, 2001.

* cited by examiner

*Primary Examiner* — Terry Cecil
(74) *Attorney, Agent, or Firm* — Nelson Mullins Riley & Scarborough, LLP

(57) ABSTRACT

A high radioactivity filter system is disclosed. The invention utilizes within a container substructure a filter employing a combination of specially selected filtration and ion exchange media and a structural design of equipment for substantially or totally providing and/or rendering Class A waste forms and preventing the formation of Class B, C and GTCC waste forms. The invention also provides both ion exchange and filtration of liquid radioactive wastestreams.

20 Claims, 3 Drawing Sheets

HIGH RADIOACTIVITY FILTER

CROSS-REFERENCE TO RELATED APPLICATION

This application claims the benefit of Provisional Application No. 61/473,020 filed Apr. 7, 2011, the disclosure of which is hereby incorporated by reference.

BACKGROUND OF THE INVENTION

1. Field of the Invention

The present invention relates to a Method, Process or System for filter technology in the area of filtration of radioactive substances, such that improvements can be provided in obtaining substantial or total amounts of Class A waste as opposed to the formation of Class B and Class C waste forms.

2. Background Information

It has been found that the current filter technology utilizes bag, cartridge and other membrane type filters with regard to filtration of radioactive waste substances. This has not been found to be appropriate for higher activity or radioactive waste substances because they can often generate waste forms having greater than Class A categorization. Also, these conventional filters have often been found to have the tendency to concentrate the waste being assimilated, which has resulted in the generation of Class B, Class C and greater than Class C (GTCC) waste. All greater than Class A waste forms are found to be both difficult and expensive to dispose of in comparison to Class A radioactive waste. These high activity waste forms can also have significant dose characteristics and require special shipping equipment that is difficult to schedule and expensive to lease. Class B and C waste must also be stabilized before burial and require a special burial facility. At present only a few utilities have access to a burial site that will accept Class B and C waste in the United States. Also, the cost of burial of Class B and C waste has been found to be approximately at least one (1) order of magnitude higher than burial costs associated with Class A waste forms. GTCC waste has no disposal facility available for it at the time that this application is being initially filed.

Class A, B and C wastes are characterized in the industry or technology by using standards defined as to analysis of analytical results which are set forth in U.S. Regulations, 10 C.F.R. 61. Under this approach, each isotope has a limit for Class A, B and C wastes that is stated in either mCi/ml or mCi/g depending upon the type of isotope. This is the limit for each isotope to stay within the classification. When more than one isotope is present, a sum of fractions approach is utilized to determine the classification. This means that each isotope concentration is divided by the classification limit that provides a fraction. If the fraction is less than 1 that isotope is within the limits of the class but must be added to the fractions of the other isotopes to determine if the mixture remains in the classification (Class A, B, C or GTCC). If the sum of the fractions is greater than 1 then the same procedure must be repeated for the next higher classification until a sum of <1 is reached or the mixture is classified as GTCC (greater than Class C).

SUMMARY OF THE INVENTION

The foregoing and other objects of the invention can be achieved with the present invention which provides for a novel process, method, system and accompanying equipment or device(s) which includes an improved high radioactivity waste filtration system for substantially or totally providing and/or rendering Class A waste forms under applicable Federal regulations.

It is an object of the present invention to provide water that is environmentally acceptable for discharge in the effluent stream, or at a minimum providing significant reduction in the radioisotope level, such that further more conventional treatment reaches the environmental discharge levels while not generating greater than Class A waste.

DESCRIPTION OF REFERENCE NUMBERS, SYMBOLS AND ABBREVIATIONS

Figure 1:
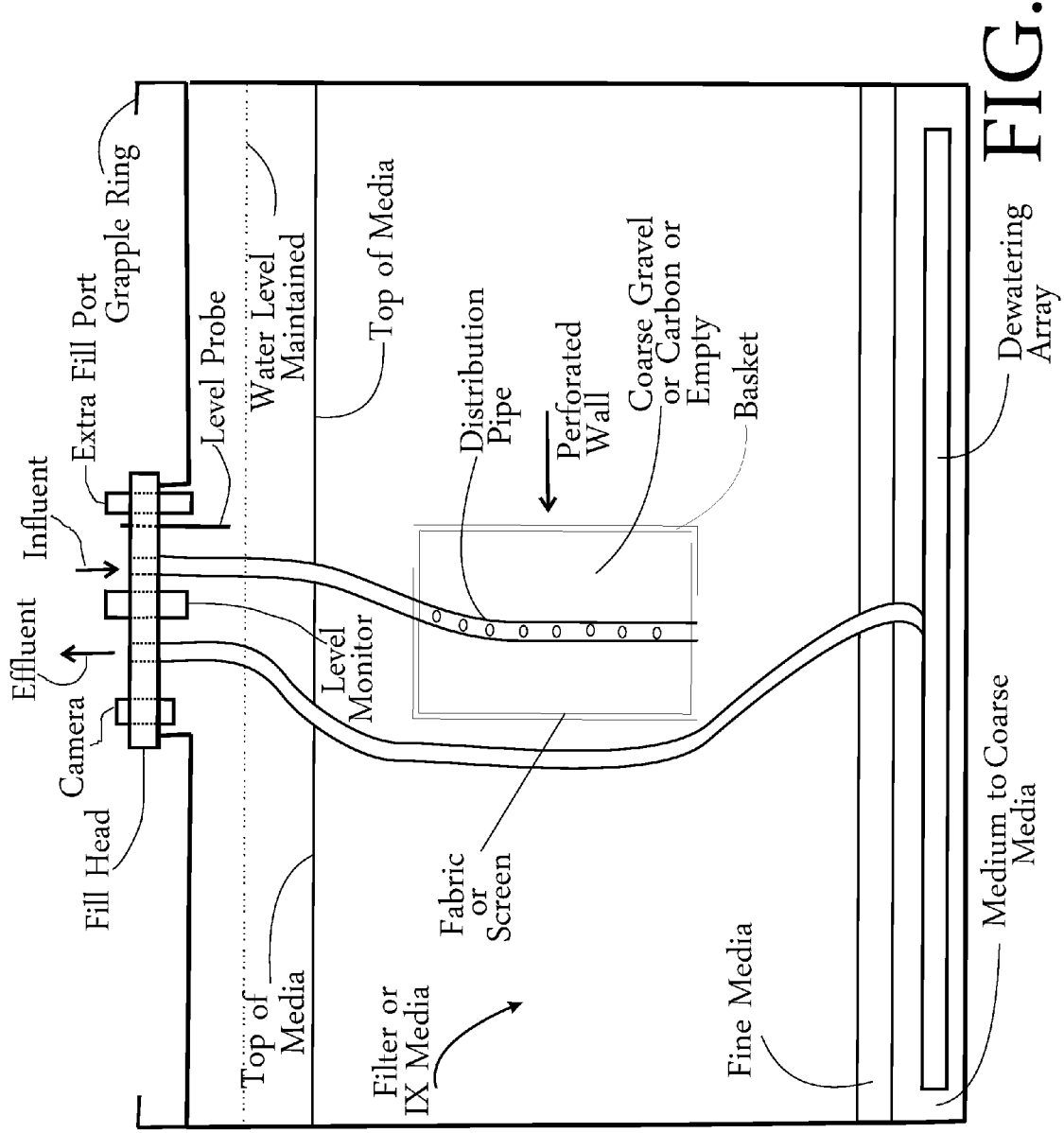
FIG. 1 is a side view of the high radioactive filter of the present invention including text descriptions.

HRF High Radioactivity Filter
10 High Radioactivity Filter, also referred to as the HRF, the system, the device, the Method, the process, or the invention
12 container or vessel
14 basket or internal basket, or baskets or internal baskets
16 perforated or slotted pipe, wedge wire screen or channel or distribution pipe or filter element
16a openings of pipe (16)
18 screen or cloth coverings, or dewatering cloth
20 remotely operated lift or grapple ring or rings
22 fill head
23 water or water line inside the container (12)
24 effluent water removal or effluent direction in removing filtered wastewater from the container (12)
26 camera or CCTV camera and light
28 point level probe
29 continuous level monitor
30 dewatering array
32 channel or effluent channel
34 medium to coarse media
36 fine media
38 coarse material or materials; coarse gravel or carbon or empty space
40 top surface of the container (12)
42 filtration and/or ion exchange media or filter or IX Media
44 extra fill port

DETAILED DESCRIPTION OF THE INVENTION

The following description of the preferred embodiments of the concepts and teachings of the present invention is made in reference to the accompanying drawing figures which constitute illustrated examples of the teachings and elements of the invention; without limitation, among many other examples, existing within the scope and spirit of the present invention.

Figure 2:
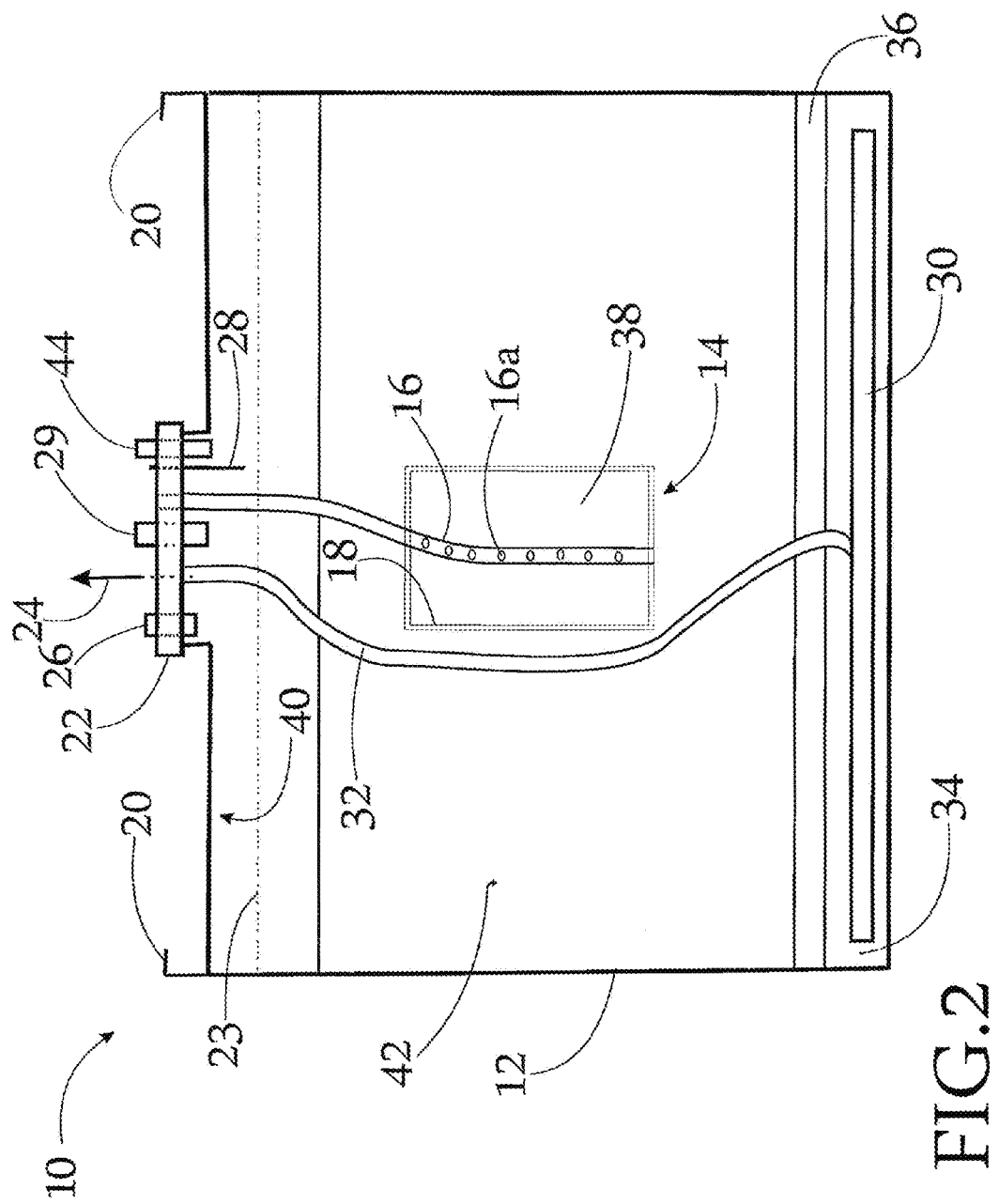
FIG. 2 is another side view of the high radioactive filter of the present invention including number designations.
Figure 3:
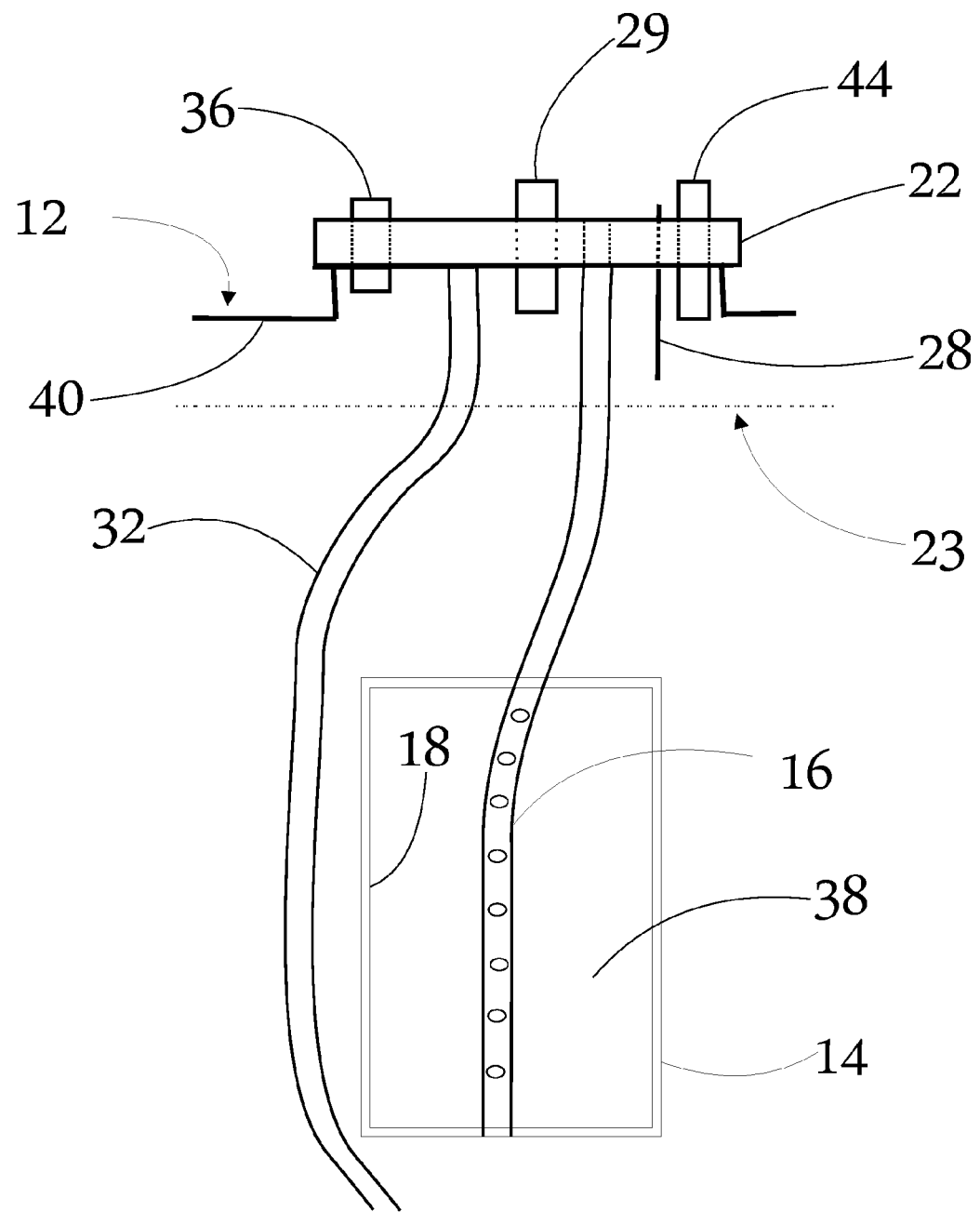
FIG. 3 is an enlarged partial view of the basket sub-assembly or sub-process of the present invention.

Referring now to the drawings, FIGS. 1 through 3, thereof, there are illustrated exemplary embodiments of the present invention addressing the High Radioactive Filter 10; and referred to hereafter as the HRF, the system, the device, the Method, the process, or the invention 10.

The HRF 10 utilizes a newly designed filter employing a combination of specially selected filtration and ion exchange media and a structural design of equipment which prevents the formation of Class B, C and GTCC waste forms. The equipment is designed to provide both ion exchange and filtration of liquid radioactive waste streams. As indicated it is an object of the HRF 10 to provide water that is environmentally acceptable for discharge in the effluent stream or at a minimum providing significant reduction in the radioisotope level so that further more conventional treatment reaches the environmental discharge levels while not generating greater than Class A waste.

As a part of further objectives of the present invention 10 it is the container 12, preferably, but not exclusively, constructed or fabricated of either steel or plastic; which provides the final burial container, enclosure or unit which meets the burial requirements with regard to dewatering and isotope classification under applicable regulatory provisions.

In preferred embodiments of the HRF 10 the container 12 has feed distribution elements, including an internal basket 14, or internal baskets, to retain and separate different media to prevent inter-mixing of these media. Dewatering internals are provided for removal of the water during processing. These dewatering internals in preferred embodiments of the invention take the form of either perforated or slotted pipe, wedge wire screen or channel 16; and can contain screen or cloth coverings 18 to prevent media migration and media plugging of the pipe openings 16a.

The screen or cloth can be located on either the inside or outside of the basket 14 depending upon loading sequence of the various media. Other types of dewatering internals can consist of sheet filters and cartridge elements. The container 12 is also provided in a preferred embodiment with a remote lift capability using a remotely operated lift or grapple. The grapple rings 20, installed on the top surface 40 of the container (12), provide the ability or means for movement of the container 12 using cranes and other remotely operated and shielded equipment, with interlocking or inter-coupling capability with the rings 20, to minimize dose to the operator. The closure of the container 12 can also be applied remotely using a specially designed split ring closure or snap on lid. The container 12 is also provided in preferred embodiments of the invention with a gaseous vent to prevent over-pressurization of the container.

The second portion of the invention is the fill head 22 that provides the connections to the container 12 to provide for distribution of the wastewater in the container 12, monitoring of the water level (23) in the container, effluent water removal (24), final dewatering of the container, temperature measurement (when required), overflow prevention, influent isolation valve(s), and disconnect mechanisms for remote disconnection of the fill head hose connections to container internals. Polymer injection into the fill line is another preferred embodiment when very fine particulate is present that may be difficult to remove by ordinary filter media. These polymer substances include both organic and inorganic based flocculants, and coagulants. Some special flocculants also have the ability to remove certain isotopes by ion exchange and then deposit them on filtration media. The addition of ozone can also be used to eliminate fouling by biological materials (i.e. bacteria, molds, algae, etc.) by destroying their cell structure. This releases their water content and turns slimy cell structure into simple debris that can be filtered without blinding media. The fill head 22 contains both continuous and point source level measurement devices. In related preferred embodiments of the HRF 10 thermal couple or thermistor connections are fabricated or constructed within the fill head so that temperatures in the container can be measured. In this preferred embodiment a CCTV camera and light 26 are mounted in the fill head 22 to visually verify liquid and solid levels in the container 12. This is important during sluicing operations and in case of loss of level indication on the continuous level probe 28.

The third portion of the invention involves a control module that controls and monitors the filling of the container. These controls vary from completely automated utilizing PLC controls with a HMI screen to more basic controls that only prevent overfilling of the container. The controls normally contain some or all of the following: continuous level measurement, high-high level probe light, flow measurement, vacuum dewatering controls, temperature readout, radiation monitors, dewatering pump controls, polymer injection, ozone injection, pH or conductivity measurement, pH adjustment, CCTV and light and influent valve controls. This equipment can be mounted remotely to the containers to maintain minimum dose to the operator. The equipment can also be mounted in a sea van container to provide environmental protection and shielding installed on the internal walls to minimize dose to the operator. The control skid also has air, water, electrical and instrument connections. A TV monitor is used as visual indication inside the container.

The fourth portion of the equipment is the grapple or grapple subassembly which is used to lift the container 12 remotely. Each of the grapple rings 20 is used to both set the container into the area where the processing is to occur and to remove the container to a transport cask, storage area or disposal location. The grapple subassembly in one preferred embodiment consists of four mechanical dogs that are extended using pneumatic or hydraulic cylinders to engage respective corresponding grapple rings 20 on the container 12. The grapple has many micro-contact switches to assure the grapple is setting in proper position on the container before the dogs are extended. The micro switches determine that the dogs have extended to the full extent before lifting the container. During the lifting, the micro switches that contact the container open and prevent the dogs from being retracted during the lift. The controls of the grapple are operated using radio frequency controls so that all operations can be done remotely using a crane. CCTV can also be used to guide the placement of the grapple and see engagement of the dogs with respective corresponding rings 20.

Preferred embodiments of the present invention contain equipment for carrying out related processes where the container 12 is preloaded with a combination of media which will provide the resulting effluent requirements based on the influent isotopic distribution. The container can be dewatered using built in dewatering internals such as that shown by example in FIGS. 1 and 2 as the dewatering array 30. The dewatering array 30 is connected by channel or effluent channel 32 through the fill head 22.

The container 12 is provided with the dewatering internal array 30 made from pipe with holes, slots or other openings that prevent media migration at the very bottom of the container 12. Depending upon the size of the media to be used, a covering over the array 30 can be used consisting of fine wire or cloth mesh. This prevents the media from migrating and also increases the flux rate into the array 30 by preventing the media from plugging the openings in that the mesh has much more area than the openings in the array 30. The dewatering piping size used in the array 30 is designed to provide both sufficient flow during effluent operation and sufficient removal of water during the dewatering operations. During dewatering in the present invention, too large a pipe diameter will permit air to bypass water thus preventing sweeping of the water from the array 30 and leaving too much water in the bottom of the container 12. Burial site waste acceptance criteria usually requires less than 0.5% free water in the container.

Therefore, using a relatively coarse media 34 is used at the bottom of the container 12 to provide relatively unrestricted flow to the dewatering array 30. The layer of coarse media 34 need only cover the dewatering array 30 and provide good horizontal movement of the water to the array 30. Typical media in this regard would have mesh size of from about 2 to about 50 mesh, but more preferably from about 10 to about 20 mesh.

The next layer of media utilized in this portion of the container is the fine media 36 which is preferably a very fine mesh material (from about 50 to about 100 mesh) that may consist of inorganic or carbon type material that is aimed at removal of very fine particulate. This media 36 is used near the dewatering array 30 so that the bulk of the solids are removed prior to reaching the fine media 36 to prevent early blinding or dysfunction of this layer.

The layers above this are either oriented toward filtration of particulate and/or ion exchange of dissolved isotopes depending upon the influent characterization applicable as set forth in the relevant Regulations of 10 C.F.R. Part 61, including presently relevant §§61.55 and 61.56. Many isotope concentrations are measured based on volume ($\mu$Ci/ml). Others, which are mainly transuranics, are based on weight ($\mu$Ci/g). Each isotope that is controlled and regulated under the provisions of 10 C.F.R. Part 61 is given a limit which when exceeded makes it Class B, Class C or greater than Class C (GTCC). The sum of the fractions of each of these isotopes must be less than 1 or the waste goes to the next classification in accordance with these regulatory provisions.

Therefore, after a waste classification, Part 61, analysis is completed it can then be used to determine loading for the container 12 so that waste classification remains Class A or less than GTCC, if stabilization and burial at this level is acceptable. If the Part 61 analysis shows that volume consideration is the limiting factor and, for example, the cesium is the controlling isotope then cation exchange media may be the best filling in the containers 12, or a cesium selective media. The volume of the media will determine how much of the cesium can be loaded in this container 12 in order to maintain the Class A limits. If Am241 is determined, for example, to be the limiting isotope, since it is weight limited, the use of a heavy filtration media is the best solution to minimize the volume of media to be buried since Am 241 Is normally a filtration target and not an ion exchange target.

When sludge is a key component in the waste stream another preferred embodiment of the invention 10 addresses this in so far as adaptations made in the container 12. In the center of the container or vessel 12, the basket 14 utilized is filled with a very coarse media 38 such as pea gravel, very coarse carbon or cellulosic material. This material is then able to remove gross particulate and retain this material in the center of the container. Since this material may contain higher activity material the surrounding material can act as shielding to reduce the contact dose of the container 12. This also protects the surrounding media from fouling. The basket 14 prevents migration of the finer material into the coarse material 38 either during transport to the treatment site or during initial filling of the container 12 with water. The basket 14 can be used as the primary separation and the finer screen/cloth 18 used as a secondary separation—the loading of the coarse material 38 in the basket done first followed by the less coarse surrounding material.

The shape and size of this basket(s) 14 is determined by the quantity of the solids to be loaded. Such basket arrangements, configurations or deployments can also be used to location to sluice high activity media used in other vessels, but to be disposed at the same time. This central loading is helpful if the media has a high dose and can utilize the surrounding media as shielding for shipping purposes. This may permit transport on an unshielded flatbed or van or the use of a shielded van versus a cask shipment. All of these advantages of the present invention make the transport process less expensive and less reliant on specialized vehicle availability.

The basket 14 is designed to prevent short circuiting to either the dewatering array 30 or the top surface 40 of the container 12. This forces water into the filtration and/or ion exchange media 42. The basket 14 is designed to be covered with a minimum amount of media to minimize dose to the top of the container 40 and break through of the particulate or water to the surface.

Media selection is determined by the isotopes in the radioactive waste to be filtered which are predominately controlling the classification. If isotopes that have a Ci/g limit are the controlling factor in this regard the media utilized should have a higher specific density to help maintain Class A classification. If the isotope controlling classification is Ci/ml then using a media that will permit larger volumes and less weight has been found in utilizing the HRF 10 to be more advantageous. Often a combination of filtration and ion exchange media may be required in utilizing the HRF 10 since some isotopes may be soluble whereas others are particulate requiring removal by filtration.

Weight Limited Isotopes (Ci/g)

As applied to the present invention 10, the best media to utilize when weight controlled isotopes are the controlling factor is media with higher specific and bulk densities. Materials which can be used without limitation, and among others, include materials that are commonly available such as sand, gravel, garnet and metal shot. In application to the invention 10, the heavier the media the higher the loading that is possible and while remaining within the Class A limitations.

Most weight limited isotopes are filtration targets in that they are insoluble.

Weight media is selected for particle size and filtration characteristics. Finer particles are usually able to remove smaller particles held in solution. With regard to application to installation in the container 12, it has been found that a negative aspect to keep in mind is using the finer material is its tendency to blind more quickly. Thus, it is preferred for placement to employ a combination of coarse media, followed by medium media and fine media in position, in the flow path of the water to be processed. It is not preferred in the present invention to utilize Fine media placement next to the dewater elements as they tend to blind, block or congest the opening of the screen or dewatering cloth 18.

It has been found in the present invention that the use of polymers and flocculants may be helpful in removing very fine particulate isotopes and attaching them to the filtration media.

Volume Limited Isotopes (Ci/ml)

Media used for volume limited isotopes being treated or processed through the HRF 10 is not directed toward weight of the media, but only toward the volume aspect. Therefore, either heavy or light weight media are utilized in this regard in the present invention. It has been found that a significant portion of the volume based isotopes are soluble, requiring the use of ion exchange or absorption media as discussed above with regard to the filter media 42. Typical cation, anion or mixed bed media are useful for processing most of these isotopes when low conductivity water is present within the HRF 10. Although they can be used for high conductivity water the useful life may be limited to a few hours or even just minutes before the media becomes chemically depleted.

The use of ion selective media in the container 12 is much better utilized when conductivities are high (such as in the case, for example, of salt water or even ground water). It is found in using the present invention that selective media targets only certain isotopes such as cesium, strontium, cobalt, antimony, and iodine among others; and allows abundant ions such as sodium, calcium, chloride, sulfate among others to pass through the media without being exchanged. Selective exchangers are often found as zeolites, constituting ion specific organics loaded on carbon media and metal based selective agents often loaded on carbon or cellulose based substrate. It is also found in the present invention that when a combination of volume and weight limited isotopes are present in the container for filtration and processing, the use of zeolites having a higher density in relation to organic based ion exchange media, is found to be advantageous.

Powdered sorbents can also be used to precipitate isotopes which are then removed using filtration. Special ion selective flocculants can also be used that selectively remove certain isotopes and then deposit these within filtration media.

It will thus be seen that the objects and advantages set forth above regarding the HRF 10, including those made apparent from the proceeding description, are efficiently attained; and, since certain changes may be made in carrying out the above structural device and functional process and in construction of suitable apparatus in which to practice the structural teachings and method of the invention and in which to produce the desired product or results as set forth herein; it is to be understood that the invention may be embodied in other specific forms without departing from the spirit or essential characteristics thereof.

For example, while we have simultaneously set forth an exemplary process/method and system where filter or IX media are utilized in lateral portions of the internal container 12, other embodiments deploying different types of media can be utilized as indicated by example in part to address specific volumetric or weight problems presented in filtering a given radioactive substance or radioactive waste, only part of which have been discussed herein by example, to attain the result of the principles of the method and system disclosed herein in obtaining Class A waste for disposal as opposed to amounts of waste found to be Class B, C or GTCC. Therefore, it will be understood that the foregoing description of representative embodiments of the invention have been presented only for purposes of illustration and for providing an understanding of the invention, and it is not intended to be exhaustive or restrictive, or to limit the invention, structurally or functionally (in terms of method or process) to the precise forms disclosed. On the contrary, the intention is to cover all modifications, equivalents, and alternatives falling within the spirit and scope of the invention as expressed in the appended claims to be filed in the progression of this case. As such, the claims are intended to cover the methods and structures described therein, and not only the equivalents or structural equivalents thereof, but also equivalent structures or methods.

Therefore, the scope of the invention, as indicated in the following are intended to include variations from the embodiments provided which are nevertheless described by the broad meaning and range properly afforded to the language of the claims or to the equivalents thereof.

We claim:

1. A high radioactivity filter system comprising:
a container substructure;
a filter arrangement within said container substructure, said filter arrangement employing a combination of specially selected filtration and ion exchange media and a structural design of equipment which prevents the formation of Class B, C and GTCC waste forms, and provides both ion exchange and filtration of liquid radioactive wastestreams;
the system further comprising dewatering internals for removing water during processing, said dewatering internals comprising influent piping through which liquid enters said container substructure and exits at a central portion of said container substructure, and separate effluent piping through which liquid enters at a bottom portion of said container substructure and exits said container substructure; and
an internal basket located at said central portion of said container substructure so as to be spaced apart from said bottom portion of said container substructure, such that liquid flowing from said influent piping passes through said internal basket and then to other media located in said container substructure.

2. The system of claim 1, further comprising:
at least one coupling structure located on the container substructure to facilitate lifting the container substructure; and
means for providing connections to internals in the container substructure for fluid fill and line injectables, distribution of the wastewater in the container substructure, monitoring of the water level in the container substructure, effluent water removal, final dewatering of the container substructure, selective temperature measurement, overflow prevention, influent isolation valve deployment and disconnect mechanisms for remote disconnection of the connections to the internals.

3. The system of claim 2, wherein the means for providing connections to internals in the container substructure comprises means for continuous and point source level measurement.

4. The system of claim 2, wherein a thermal couple or thermistor connections are fabricated or constructed within said means for providing connections to internals in the container substructure for measuring temperatures in the container.

5. The system of claim 4, wherein a camera and light are mounted in and supported by said means for providing connections to internals for visual verification of liquid and solid levels in said container substructure.

6. The system of claim 2, further comprising means for engaging the at least one coupling structure and lifting and moving the container substructure.

7. The system of claim 6, wherein the means for engaging the at least one coupling structure comprises a lift or grapple subassembly.

8. The system of claim 1, further comprising a control module means for controlling and monitoring the filling of the container substructure.

9. The system of claim 8, wherein the control module means includes at least one control element or equipment selected from a group of such elements or equipment consisting of continuous level measurement, high-high level probe light, flow measurement, vacuum dewatering controls, temperature readout, radiation monitors, dewatering pump controls, polymer injection, ozone injection, pH or conductivity measurement, pH adjustment, internal visual monitor, camera, light, and influent valve controls; and air, water, electrical and instrument connections; and wherein said equipment being mounted and remotely responsive in relation to the container to inhibit exposure or dose to an operator.

10. The system of claim 9, wherein the control module having equipment for carrying out related processes wherein the container substructure being preloaded with a combination of media and providing the resulting effluent requirements based on the influent isotopic distribution.

11. The system of claim 1, wherein the dewatering internals comprise a dewatering internal array comprising pipe with holes, slots or other openings that prevent media migration at the bottom portion of the container substructure.

12. The system of claim 11, further comprising a means for covering over the array selected from at least one of a group of materials consisting of fine wire and cloth mesh; and wherein the means for covering thereby prevent the media from migrating so as to plug the openings.

13. The system of claim 12, further comprising generally coarse media positioned at the bottom of the container substructure for providing generally unrestricted flow to the dewatering internal array.

14. The system of claim 13, wherein the coarse media covers the dewatering internal array and provides horizontal movement of a water component or volume to the array.

15. The system of claim 14, wherein the media having a mesh size of from about 2 mesh to about 50 mesh.

16. The system of claim 15, wherein the mesh size being from about 10 mesh to about 20 mesh.

17. A high radioactivity filter device providing both ion exchange and filtration of liquid radioactive wastestreams, the device comprising:

a container;

a fill head platform fixedly and sealably mounted on the container;

at least one internal basket housed within the container at a central location spaced apart from a top, bottom, and sides thereof, said at least one internal basket having a basket element connecting with the fill head for influent conveyance and at least one covering element positioned around the basket element;

a dewatering array, housed within the container in a portion of the container spaced and generally, positionally opposite in positional orientation to that of the fill head platform, said array having an effluent channel extending to said fill head where filtered wastewater is removed from the container; and a plurality of regional media formations positioned within the container, comprising at least a medium to coarse media formation, a fine media formation and a filtration or ion exchange media formation.

18. The device of claim 17, wherein said covering element has an outer perforated wall and defining a filtration spacing area circumventing the basket element and supported positionally between said perforated wall and said basket element;

said outer perforated wall being fabricated from at least one of a group of materials consisting of screen covering, cloth covering, fabric covering, and dewatering cloth; and said filtration spacing area housing and constituting at least one of a group of filtering components consisting of coarse material, coarse materials, coarse gravel, carbon and empty spacing.

19. The device of claim 18, wherein, the fill head is adapted to house and support at least one of a group of elements consisting of a means of photographic observation, a level probe, a level monitor and an extra fill port.

20. A high radioactivity filter device providing both ion exchange and filtration of liquid radioactive wastestreams, the device comprising:

a container;

influent piping and effluent piping to conduct liquid into and out of said container, respectively;

at least one internal basket housed within the container at a central location spaced apart from a top, bottom, and sides thereof, said at least one internal basket surrounding a portion of said influent piping at which said liquid exits;

coarse media located in said at least one internal basket to remove gross particulate in the liquid prior to the liquid passing from said at least one internal basket;

a dewatering array forming part of said effluent piping, said dewatering array housed within the container at a bottom portion thereof; and ion exchange media located in said container such that liquid passing from said at least one internal basket passes through said ion exchange media before flowing into the dewatering array.

* * * * *